Patented June 3, 1952

2,599,123

UNITED STATES PATENT OFFICE 2,599,123

COPOLYMERS OF ETHYLENE WITH AN ALKYL ACRYLATE AND AN ALKYL MONO-ESTER OF A BUTENE-1,4-DIOIC ACID

Paul S. Pinkney, Niagara Falls, N. Y., and Burt C. Pratt and Winston J. Wayne, Wilmington, Del., assignors to E. I. du Pont de Nemours & Company, Wilmington, Del., a corporation of Delaware No Drawing. Application August 18, 1950, Serial No. 180,302

12 Claims. (Cl. 260—78.5)

This invention relates to polymeric products and more particularly to new copolymers, methods for their preparation, films comprising the copolymers and articles coated with said copolymers.

It is an object of this invention to provide new polymeric products and methods for their preparation. A further object is to prepare novel three-component copolymers containing ethylene and methods for their preparation. A still further object is to prepare novel cured or cross-linked copolymers, films comprising said cured or cross-linked copolymers and articles coated with said cured or cross-linked copolymers. Other objects will appear hereinafter.

The objects of this invention are accomplished by providing copolymers of ethylene with an alkyl acrylate and an alkyl monoester of a butene-1,4-dioic acid having an ethylene/alkyl acrylate mole ratio of 0.25:1 to 8:1 and an alkyl monoester of a butene-1,4-dioic acid/alkyl acrylate mole ratio of 0.02:1 to 0.50:1. This invention also provides methods for curing or cross-linking such copolymers and the resulting cured or cross-linked products. Also included as a part of this invention are films comprising said cured or cross-linked copolymers and articles, such as textiles, coated with the cured or cross-linked copolymers.

The ethylene/alkyl acrylate/alkyl monester of a butene-1,4-dioic acid copolymers of this invention can be made either by bulk or solution batch, semi-continuous, or continuous polymerization methods. In a batch method of polymerization, a pressure reactor is charged with the alkyl acrylate, alkyl monoester of the butene-1,4-dioic acid, reaction medium, and a compound capable of generating unstable free-radicals under the conditions of reaction employed. The reactor is cooled to 0° C., or lower, swept with oxygen-free nitrogen, and then evacuated. The reactor is pressured with ethylene to a selected pressure and the charged reactor placed on an agitating rack fitted with heating means. Heating and agitation are started, and after the temperature selected for reaction has been reached, the pressure is adjusted with ethylene to the desired level. Throughout the period of reaction the pressure is maintained by periodically repressuring with ethylene.

After the reaction is stopped, the reactor is permitted to cool and the contents discharged. The desired copolymer, if insoluble in the reaction medium, is isolated by filtration, followed by steaming, washing and drying. If the copolymer is soluble in the reaction medium, it can be isolated by removing the solvent by vacuum distillation or steam distillation, transferring it to means whereby work can be done on it, and then washing while it is being worked. The washed polymer is then dried.

The examples which follow are submitted to illustrate and not to limit this invention.

EXAMPLE I

A 1200-cc. stainless steel-lined rocker bomb was swept with nitrogen and charged with 120 g. of methyl acrylate, 18 g. of methyl hydrogen maleate, 300 g. of t-butyl alcohol, and 0.3 g. of alpha,alpha'-azodiisobutyronitrile. The bomb was then cooled to below 0° C., evacuated, pressured with ethylene, heated to 75° C., and then repressured with ethylene to 1000 atmospheres. The bomb was rocked for 12 hours and the pressure maintained at 900 to 1000 atmospheres by periodic addition of ethylene. The temperature range was 74°–78° C. At the end of the reaction, the polymer was removed as a taffy-like lump and steam passed through it to remove unreacted monomer. The polymer was then washed on a wash-mill and milled dry at 160° C. The polymer weighed 157 g. and analyzed 64.06% carbon and 9.20% hydrogen, and 35.4 acid number, which corresponds to 34.4% ethylene, 61% methyl acrylate, and 4.6% methyl hydrogen maleate. The mole ratio of ethylene/methyl acrylate/methyl hydrogen maleate was 1.7:1:0.08. Inherent viscosity (0.125% solution in xylene at 85° C.) was 0.53.

EXAMPLE II

Example I was repeated with a charge consisting of 60 g. of methyl acrylate, 15 g. of methyl hydrogen maleate, 300 g. of t-butyl alcohol, and 0.3 g. of alpha,alpha'-azodiisobutyronitrile. The bomb was pressured with ethylene to 1000 atmospheres. After the reaction had run for 8 hours at 73°–76° C. and 880–1000 atmospheres of ethylene, the polymer was removed, steamed, washed, and milled dry at 160° C. The polymer weighed 112 g. and analyzed 69.09% carbon, 10.50% hydrogen, and 41.8 acid number, which corresponds to 52.5% ethylene, 42.0% methyl acrylate, and 5.5% methyl hydrogen maleate. The mole ratio of ethylene/methyl acrylate/methyl hydrogen maleate was 3.8:1:0.15. Inherent viscosity (0.125% solution in xylene at 85° C.) was 0.56. The density of the polymer was 1.059.

EXAMPLE III

A 400-cc. stainless steel-lined shaker tube was swept with nitrogen and charged with 20 g. of methyl acrylate, 5 g. of methyl hydrogen maleate, 100 g. of t-butyl alcohol, and 0.1 g. of alpha,-alpha'-azodiisobutyronitrile. The tube was cooled to below 0° C., evacuated, pressured with ethylene, heated to 75° C., and then repressured with ethylene to 1000 atmospheres. The tube was shaken for 10 hours at 75°–77° C. and 840–1000 atmospheres pressure, maintained by periodic repressuring with ethylene. The polymer was removed, steamed to remove unreacted monomer, and milled dry at 150° C. It weighed 39 g. and analyzed 67.74% carbon, 9.99% hydrogen, and 62.3 acid number, which corresponds to 44.8% ethylene, 40.6% methyl acrylate, and 14.5% methyl hydrogen maleate. The mole ratio of ethylene/methyl acrylate/methyl hydrogen maleate was 3.4:1:0.24. Inherent viscosity (0.125% solution in xylene at 85° C.) was 0.45.

EXAMPLE IV

The preparation was carried out using the quantities of materials, conditions, and equipment of Example III. Forty-two grams of polymer was obtained which analyzed 67.68% carbon, 10.13% hydrogen, and 43.0 acid number, which corresponds to 43.5% ethylene, 46.5% methyl acrylate, and 10% methyl hydrogen maleate. The ethylene/methyl acrylate/methyl hydrogen maleate mole ratio was 2.9:1:0.14. Inherent viscosity (0.125% solution in xylene at 85° C.) was 0.47. The density of the polymer was 1.067.

EXAMPLE V

Example III was repeated with a charge consisting of 5 g. of methyl acrylate, 1 g. of methyl hydrogen maleate, 100 g. of benzene, and 0.15 g. of 1,1′-azodicyclohexane carbonitrile. The reaction was run for 5.5 hours at 93°–95° C. and 895–955 atmospheres of ethylene. The polymer was obtained as a solution and weighed 10 g. after isolation. It analyzed 74.49% carbon, 11.43% hydrogen, and 26.3 acid number, which corresponds to 64.5% ethylene, 29.4% methyl acrylate, and 6.1% methyl hydrogen maleate. The ethylene/methyl acrylate/methyl hydrogen maleate mole ratio was 6.6:1:0.29. Inherent viscosity (0.125% solution in xylene at 85° C.) was 0.60.

EXAMPLE VI

Example III was repeated with a charge consisting of 16 g. of methyl acrylate, 11 g. of methyl hydrogen maleate, 100 g. of t-butyl alcohol, and 0.1 g. of alpha,alpha′-azodiisobutyronitrile. The reaction was run for 10 hours at 74°–76° C. and 850–960 atmospheres of ethylene. There was obtained 33 g. of polymer which analyzed 64.24% carbon, 9.29% hydrogen, and 10.62 acid number, which corresponds to 36.8% ethylene, 38.5% methyl acrylate, and 24.7% methyl hydrogen maleate. The mole ratio of ethylene/methyl acrylate/methyl hydrogen maleate was 2.9:1:0.42.

The examples below illustrate the preparation of cured copolymers and films and coatings of the copolymers of this invention.

EXAMPLE VII

The ethylene/methyl acrylate/methyl hydrogen maleate (1.7:1:0.08 mole ratio) copolymer of Example I was compounded as follows:

| | Grams |
|---|---|
| Polymer | 100 |
| Magnesium oxide | 12 |
| Litharge | 4 |
| Dipentamethylene thiuram tetrasulfide | 1 |
| Hydrogenated rosin | 2.5 |
| N,N′-Diphenyl-p-phenylenediamine | 1 |
| Calcium carbonate | 40 |
| Polyethylene glycol | 5 |

The ingredients were milled together on a two-roll rubber mill until homogeneous and the blend then pressed to a 24-mil film at 125° C. for two minutes. The film, after being heated in an oven at 165° C. for four hours, was cured. It was insoluble in solvents for the original polymer, pliable, elastic, tough, resistant to plastic flow, and resistant to marring at elevated temperatures. The properties of the cured composition in comparison with those of the original copolymer are shown in the table below:

| | Untreated Copolymer | Cured Copolymer |
|---|---|---|
| Tensile Strength (lb./sq. in.) | 130 | 3,540 |
| Elongation (Per Cent) | >2,000 | 225 |
| Mar Temperature (°C.) | 75 | >165 |
| Solubility in Aromatic Hydrocarbon | partly soluble | insoluble |

The cured copolymer underwent little change during three months' outdoor exposure.

EXAMPLE VIII

The ethylene/methyl acrylate/methyl hydrogen maleate (1.7:1:0.08 mole ratio) copolymer of Example I was formulated into the following curing composition:

| | Grams |
|---|---|
| Polymer | 100 |
| Zinc oxide | 4 |
| Sulfur | 2 |
| Benzothiazyl disulfide | 1 |
| Stearic acid | 2 |
| N,N′-Diphenyl-p-phenylenediamine | 1 |
| Clay | 40 |
| Titanium dioxide | 9.6 |
| Copper phthalocyanine blue pigment | 0.4 |
| Magnesium stearate | 2 |

Pressed film after being baked in an oven at 155°–165° C. for 4 hours possessed a balance of properties desirable for upholstery and similar uses, namely, good toughness, good pliability at ordinary and low temperatures, elasticity, resistance to plastic flow, and resistance to marring at elevated temperatures. In contrast to this, an ethylene/methyl acrylate (1.3:1 mole ratio) copolymer with very similar original physical properties was practically uncured when heated with the same curing ingredients under the same conditions. This ethylene/methyl acrylate compounded heat-treated composition was weak, soft, inelastic, showed plastic flow, and marred at low temperatures. These results are summarized in the following table:

*Cured polymer films*

| Polymer | E/MA/MHM[1] | E/MA[2] |
|---|---|---|
| (mole ratio) | (1.7:1:0.08) | (1.3:1) |
| Tensile Strength (lb./sq. in.) | 3,370 | 60 |
| Elongation (Per Cent) | 230 | 620 |
| Modulus at 100% Elongation (lb./sq. in.) | 1,460 | 60 |
| Pliability | good | very good |
| Brittle Temp. (°C.) | −20 | −30 |
| Mar Temp. (°C.) | 165 | 80 |
| Elasticity | good | very poor |

[1] E/MA/MHM=ethylene/methyl acrylate/methyl hydrogen maleate
[2] E/MA=ethylene/methyl acrylate

EXAMPLE IX

Ethylene/methyl acrylate/methyl hydrogen maleate (1.7:1:0.08 mole ratio) copolymer compounded with the curing formulation described in Example VIII was calendered onto cloth at 110° F. The resulting coated fabric after being cured at 150° C. for 4 hours was very resistant to damage by flexing or scrub tests, pliable at ordinary and low temperatures, resistant to marring at high temperatures, and resistant to crocking. In addition, the coating showed extures and to plastic flow. It was thus tightly cured in contrast to the original polymer which was soluble and weak, marred at moderate temperatures, and showed plastic flow. The cured film showed excellent stability in water (boiling and at 25° C.) and when heated in air (149° C.). The foregoing data is summarized in the following table:

|  | Untreated Polymer | Cured Polymer | | | |
|---|---|---|---|---|---|
|  |  | Initial | After 35 hrs. Boiling H₂O (tested dry) | After 4 days 25° C. H₂O (tested wet) | After 7 days 149° C. oven |
| Tensile Strength (lb./sq. in.) | 630 | 3,400 | 3,310 | 2,290 | 3,100 |
| Elongation (Per Cent) | 525 | 170 | 160 | 280 | 110 |
| Modulus at 100% Elongation (lb./sq. in.) | ---------- | 1,770 | 2,120 | 1,000 | 2,600 |
| Pliability | good | good | fair | good | fair |
| Brittle Temp. (°C.) | <−70 | −45 | −25 | ---------- | −10 |
| Mar Temp. (°C.) | 80 | >165 | >165 | ---------- | >165 |
| Elasticity | fair | good | good | good | good | ceptional resistance to a simulated perspiration preparation consisting of the following:

| | Grams |
|---|---|
| Water | 2000 |
| Sodium chloride | 20 |
| Acetone | 2 |
| Lactic acid | 6 |
| Oxalic acid | 6 |
| Urea | 2 |
| Uric acid | 2 |
| Formaldehyde | 1 |
| Lanolin | 2040 |

The coating showed no failure during 84 days while in contact with this preparation under a pressure of 4 ozs./sq. in. at 70° C.

EXAMPLE X

Ethylene/methyl acrylate/methyl hydrogen maleate (1.7:1:0.08 mole ratio) copolymer of Example I was compounded on a rubber mill with the following curing formulation:

| | Grams |
|---|---|
| Polymer | 100 |
| p,p'-Methylene diphenylisocyanate | 10 |
| Calcium carbonate | 40 |

Film cured in an oven at 165° C. for 4 hours was tough, pliable at ordinary and low temperatures, elastic, and resistant to plastic flow and to marring at high temperatures. It was resistant to simulated perspiration at 70° C., the test described in Example IX, showing only very slight softening and fair swelling after 61 days of test.

EXAMPLE XI

The ethylene/methyl acrylate/methyl hydrogen maleate (3.8:1:0.15 mole ratio) copolymer of Example II was compounded with the following curing formulation on a two-roll rubber mill.

| | Grams |
|---|---|
| Polymer | 100 |
| Magnesium oxide | 12 |
| Litharge | 4 |
| Dipentamethylene thiuram tetrasulfide | 1 |
| Hydrogenated rosin | 2.5 |
| N,N'-Diphenyl-p-phenylenediamine | 1 |
| Calcium carbonate | 20 |
| Titanium dioxide | 9.6 |
| Copper phthalocyanine blue pigment | 0.4 |
| Polyethylene glycol | 5 |

A 20-mil pressed film after being heated in an oven at 155° C. for 4 hours was insoluble in solvents for the original polymer, exceptionally tough, pliable at ordinary and low temperatures, elastic and resistant to marring at high tempera- The cured polymer was also exceptionally resistant to simulated perspiration at 70° C., showing only very slight surface softening after 89 days, and exceptionally resistant to vegetable oil, showing no change after 89 days in contact with olive oil at 70° C. Its absorption of xylene (24 hours at room temperature) and of lubricating oil (70 hours at 270° F.) was low. The cured film changed very little during six months' outdoor exposure, showing only a small increase in tensile strength and modulus and a slight decrease in pliability.

EXAMPLE XII

The composition of Example VIII was formulated using the ethylene/methyl acrylate/methyl hydrogen maleate (3.8:1:0.15 mole ratio) copolymer of Example II. The composition was heated as a pressed film in an oven at 165° C. for 4 hours. The film obtained was very tough, pliable, elastic, resistant to marring at high temperature, and durable on outdoor exposure.

EXAMPLE XIII

The ethylene/methyl acrylate/methyl hydrogen maleate (3.8:1:0.15 mole ratio) copolymer of Example II was compounded on a rubber mill with the following ingredients:

| | Grams |
|---|---|
| Polymer | 100 |
| Calcium hydroxide | 4 |
| Sodium meta-silicate·5H₂O | 10 |
| Stearic acid | 3 |
| Calcium carbonate | 30 |

Films baked at 165° C. for 4 hours were very tough, pliable, elastic, resistant to marring at elevated temperatures, and stable against water. Boiling in water for 35 hours increased its toughness and decreased its pliability by only moderate amounts.

EXAMPLE XIV

The ethylene/methyl acrylate/methyl hydrogen maleate (3.8:1:0.15 mole ratio) copolymer of Example II was compounded in a mix including a polyfunctional amine:

| | Grams |
|---|---|
| Polymer | 100 |
| Triethylenetetramine | 5 |
| Stearic acid | 2 |
| Calcium carbonate | 30 |

The blend was cured at 165° C. for 4 hours in the form of a film. The product obtained had the toughness, pliability, and elasticity desired for upholstery and coated fabrics.

EXAMPLE XV

The ethylene/methyl acrylate/methyl hydrogen maleate (3.8:1:0.15 mole ratio) copolymer of Example II was compounded in a mix including a compound containing oxirane groups:

|   | Grams |
|---|---|
| Polymer | 100 |
| Epichlorohydrin-diphenylolpropane condensation product | 5 |
| Stearic acid | 2 |
| Calcium carbonate | 30 |

A pressed film after being cured in an oven at 165° C. for 4 hours was tough, pliable, elastic, and resistant to plastic flow and marring at elevated temperatures.

EXAMPLE XVI

The ethylene/methyl acrylate/methyl hydrogen maleate (3.4:1:0.24 mole ratio) copolymer of Example III was compounded on a rubber mill with the following ingredients:

|   | Grams |
|---|---|
| Polymer | 100 |
| Litharge | 5 |
| Iron oxide | 25 |

A pressed film of this composition after being baked at 165° C. for 4 hours was insoluble, quite tough, pliable, elastic, and resistant to plastic flow and to marring at elevated temperatures, in contrast to the untreated polymer which was soluble and softened at moderate temperatures. The cured film was durable during 6 months exposure outdoors.

EXAMPLE XVII

The ethylene/methyl acrylate/methyl hydrogen maleate (2.9:1:0.14 mole ratio) copolymer of Example IV was compounded on a two-roll rubber mill with the following ingredients:

|   | Grams |
|---|---|
| Polymer | 100 |
| Lead resinate | 15 |
| Calcium carbonate | 20 |

A pressed film of this composition after being heated in an oven at 165° C. for 4 hours was tightly cured as shown by its insolubility in solvents for the original polymer, toughness, good pliability at ordinary and low temperatures, elasticity, and resistance to marring at elevated temperatures. The untreated polymer was soluble, softened at moderate temperatures, and exhibited plastic flow.

EXAMPLE XVIII

The ethylene/methyl acrylate/methyl hydrogen maleate (2.9:1:0.14 mole ratio) copolymer of Example IV was compounded with the following curing ingredients:

|   | Grams |
|---|---|
| Polymer | 100 |
| Poly(titanyl) distearate | 20 |
| Calcium carbonate | 20 |

A film of this composition after being cured by baking in an oven at 165° C. for 4 hours possessed properties desirable for upholstery film and coated fabric, and other elastomer uses, namely, toughness, good pliability, elasticity, and resistance to marring at elevated temperatures and to plastic flow.

The alkyl monoesters of the butene 1,4-dioic acids can be made readily by simply warming the anhydride of the butene-1, 4-dioic acid with about 5% excess alcohol on a steam bath until solution is complete and an exothermic reaction has set in. After the reaction has subsided, heating is continued for about 60 minutes longer.

The alkyl acrylates can be made either by alcohol interchange, by treating an acrylyl halide with a metal alcoholate, or by esterifying acrylic acid with the alcohol in the presence of an acid catalyst such as benzene sulfonic acid or by other methods well known to those skilled in the art.

The butene-1,4-dioic acid esters used in the preparation of the copolymers of this invention conform to the general formula

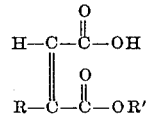

in which R is hydrogen or a monovalent hydrocarbon radical containing up to 18 carbon atoms, e. g., alkyl, aryl, cycloalkyl, or aralkyl groups, e. g., methyl, ethyl, propyl, octyl, decyl, phenyl, tolyl xylyl, benzyl cyclohexyl, methylcyclohexyl, and the like and R' is a monovalent hydrocarbon radical containing up to 20 carbon atoms such as methyl, ethyl, propyl, octyl, dodecyl, octadecyl, benzyl, menthyl, cyclohexyl, and the like.

The preferred alkyl monoesters of butene-1,4-dioic acids are those of maleic and fumaric acids. Specific examples are methyl, ethyl, propyl, butyl, decyl, dodecyl, and octadecyl hydrogen maleates and fumarates.

Instead of the alkyl esters of acrylic acid, there can be used herein as equivalents thereof the alkyl esters of alpha-alkyl acrylic acids, such as, methacrylic acid. Usefully employable alkyl acrylates are those containing up to 18 carbon atoms in the alkyl group, such as, methyl, ethyl, propyl, butyl, octyl, decyl, dodecyl, and octadecyl acrylates and methacrylates.

Although the copolymers of this invention can be made in the absence of a solvent or diluent the use of such solvents or diluents constitutes the preferred practice because better control of the reaction is obtained thereby. Useful solvents are t-butyl alcohol, and benzene. Solvents which are capable of functioning as chain transfer agents are sometimes used to control molecular weight. The alcohols, such as methyl, ethyl and propyl alcohols, constitute an especially useful class of chain transfer agents.

In the preparation of the products of this invention there can be used as a catalyst any compound capable of generating unstable free-radicals under the conditions of reaction. Examples of such compounds are azo compounds of the type disclosed in U. S. Patent 2,471,959 such as alpha, alpha'-azodiisobutyronitrile, alpha, alpha' - azobis(alpha,gamma - dimethylvaleronitrile), dimethyl and diethyl alpha,alpha'-azodiisobutyrate, 1,1'-azodicyclohexanecarbonitrile), alpha,alpha' - azobis(alpha - ethylbutyronitrile), alpha,alpha' - azodiisobutyrocarbonamide, alpha(carbamylazo)isobutyronitrile, etc., azines oximes, amine oxides, peroxy compounds such as organic peroxides, peroxy salts, hydroperoxides, percarboxylates, etc. Examples of such compounds are benzoyl peroxide, diethyl peroxide, tert.-butyl pentamethylpropyl peroxide, di(tert.-butyl)peroxide, sodium, potassium, and ammonium persulfates, tertiary butyl hydroperoxide, ethyl hydroperoxide, benzalazine, dephenylketazine, hydrazine hydrochloride, acetoxime, camphoroxime, trimethylamine oxide, etc. Combinations of two or more of these catalysts may be used, if desired.

The concentration of catalyst may be varied over a wide range. For reasons of economy it is desirable to use as small an amount of catalyst as possible, for example, 0.10% of the combined weights of the alkyl monoester of the butene-1,4-dioic acid and alkyl acrylate. As a rule larger amounts of the order of 0.20 to 10% of the combined weights of the alkyl monoester of the butene-1,4-dioic acid and alkyl acrylate are used because of the better conversions and higher reaction rates thereby attained.

In the preparation of the copolymers of this invention pressures ranging from slightly above atmospheric to 3000 atmospheres and above can be used. Generally, however, pressures of from 400 to 1500 atmospheres are used because this combines a proper balance between simplicity of equipment and good reaction rate.

The copolymerization of the ethylene with the alkyl acrylate and alkyl monoester of the butene-1,4-dioic acid can be effected at temperatures of from 0° to 250° C. Because good reaction rates and yields of desired copolymers are obtained at temperatures from 60° to 160° C., this constitutes the preferred operating range.

The copolymers of this invention correspond in composition to products containing from 0.25:1 to 8:1 ethylene/alkyl acrylate mole ratios and from 0.02:1 to 0.50:1 alkyl monoester of the butene-1,4-dioic acid/alkyl acrylate mole ratios. The preferred compositions for use in the preparation of films and as coatings for flexible substrates are those having ethylene/alkyl acrylate mole ratios of from 1.5:1 to 4:1 and alkyl monoester of the butene-1,4-dioic acid/alkyl acrylate mole ratios of from 00.5:1 to 0.25:1.

The copolymers as obtained from the polymerization reaction are in general pliable, fairly soft, thermoplastic, soluble materials. The copolymers are stable during long storage as they are resistant to moisture, heat, and oxidation. Curing of the copolymers by reaction of the carboxyl groups with suitable agents transforms them to insoluble, tough, pliable, elastic materials which are resistant to plastic flow and to marring at elevated temperatures.

Curing agents for the copolymers include chemicals showing polyreactivity with carboxyl groups, such as polyvalent metal oxides, polyvalent metal hydroxides, salts of polyvalent metal hydroxides with weak acids, polyfunctional isocyanates, polyfunctional amines, polyfunctional oxirane compounds, and polyfunctional alcohols. The polyvalent metal oxides, particularly the divalent metal oxides, such as litharge, magnesia, zinc oxide, red lead, and barium oxide, are particularly good curing agents for the copolymers, especially when cured in combination with curing aids such as accelerators, high molecular weight weak acids, antioxidants, sulfur, and reinforcing agents. Divalent metal hydroxides and their salts with weak acids, such as stearic acid and rosin, also cure the copolymers.

The formulations destined for curing can contain, in addition to the cross-linking curing agent, auxiliary materials which impart specific effects. Thus, a metal oxide curing formulation may contain per 100 parts of copolymer, 2 to 60 parts of di- or polyvalent metal oxide; 0 to 30 parts of a high molecular weight mono- or polybasic acid such as stearic acid or rosin; 0 to 10 parts of accelerator such as dipentamethylene thiuram disulfide, diphenylguanidine, ethylidene aniline, or benzothiazyl disulfide; 0 to 5 parts of antioxidant such as N,N'-diphenyl-p-phenylenediamine, p-phenyl phenol, or phenyl-alpha-naphthylamine; and 0 to 200 parts of filler or reinforcing agent such as carbon black, barium sulfate, clay, calcium carbonate, calcium sulfate, Kaolin, or titanium dioxide. The metal oxide curing formulation may also contain 0 to 5 parts of sulfur; organic fillers or extenders such as asphalt, factice, or polyisobutylene; lubricants such as polyethylene glycol or magnesium stearate; pigments; stabilizers; and blowing agents.

When polyfunctional amines, isocyanates, oxirane compounds, or alcohols are used as the curing agent, the formulation may also contain fillers, reinforcing agents, high molecular weight weak acids, antioxidants, extenders, and lubricants.

The copolymers are blended with the other components employed in the curing formulation on rubber mill-rolls, by ball-milling the curing formulation in the polymer solution, or by mixing the ball-milled formulation with a copolymer dispersion. Blends of the copolymers with curing agents can be applied to fabric either by calendering or spreading from solution or dispersion. Self-supported films of curable blends can be made in similar fashion or by pressing.

The films or coated fabrics are cured for from 15 minutes to 6 hours at 100° to 180° C., although a curing period of 30 minutes to 4 hours at 120° to 165° C. is generally used.

Cured coatings are tough, pliable at ordinary and low temperatures, elastic, durable to flexing and abrasion, and resistant to marring at elevated temperatures. In addition, they are remarkably resistant to degradation by light, dry heat, water, aromatic hydrocarbons, petroleum oils, vegetable oils, simulated perspiration, or outdoor exposure. These cured products therefore find applications as self-supported films, as coatings for flexible substrates, such as fabric coatings and in a wide variety of upholstery and industrial film uses.

The cured copolymers compared to other known cured elastomeric polymers possess advantages, such as superior heat resistance and aging properties, because they contain no halogens or residual unsaturation. Ethylene/alkyl acrylate copolymers are much less readily and less tightly cured than the copolymers of this invention and, in addition, show greatly inferior resistance to dry heat, vegetable oils, simulated perspiration, and outdoor aging.

The cured copolymers of this invention find use as coated fabrics and self-supported films for upholstery and mechanical goods, flooring, footwear, wire insulation, laboratory supplies, and sponge products.

As many apparently widely different embodiments of this invention may be made without departing from the spirit and scope thereof, it is to be understood that this invention is not limited to the specific embodiments thereof except as defined in the appended claims.

We claim:

1. A copolymer of ethylene with an alkyl acrylate and an akyl hydrogen maleate having an ethylene/alkyl acrylate mole ratio of 0.25:1 to 8:1 and an alkyl hydrogen maleate/alkyl acrylate mole ratio of 0.02:1 to 0.50:1.

2. A copolymer of ethylene with an alkyl acrylate and an alkyl hydrogen maleate having an ethylene/alkyl acrylate mole ratio of 1.5:1 to 4:1 and an alkyl hydrogen maleate/alkyl acrylate mole ratio of 0.05:1 to 0.25:1.

3. A film comprising a cross-linked copolymer which is the reaction product obtained by heating at a temperature of 100° to 180° C., a copolymer as set forth in claim 2 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

4. A flexible substrate containing a coating comprising a cross-linked copolymer which is the reaction product obtained by heating at a temperature of 100° to 180° C., a copolymer as set forth in claim 2 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

5. A copolymer of ethylene with methyl acrylate and methyl hydrogen maleate having an ethylene/methyl acrylate mole ratio of 0.25:1 to 8:1 and a methyl hydrogen maleate/methyl acrylate mole ratio of 0.02:1 to 0.50:1.

6. A copolymer of ethylene with methyl acrylate and methyl hydrogen maleate having an ethylene/methyl acrylate mole ratio of 1.5:1 to 4:1 and a methyl hydrogen maleate/methyl acrylate mole ratio of 0.05:1 to 0.25:1.

7. A film comprising a cross-linked copolymer which is the reaction product obtained by heating at a temperature of 100° to 180° C., a copolymer as set forth in claim 6 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

8. A flexible substrate containing a coating comprising a cross-linked copolymer which is the reaction product obtained by heating at a temperature of 100° to 180° C., a copolymer as set forth in claim 6 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

9. A copolymer of ethylene with an alkyl acrylate and an alkyl monoester of a butene-1,4-dioic acid having an ethylene/alkyl acrylate mole ratio of 0.25:1 to 8:1 and an alkyl monoester of a butene-1,4-dioic acid/alkyl acrylate mole ratio of 0.02:1 to 0.50:1.

10. A cross-linked copolymer which is the reaction product obtained by heating at a temperature of 100° to 180° C. a copolymer as set forth in claim 9 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

11. A film comprising a cross-linked copolymer which is the reaction product obtained by heating at a temperature of 100° to 180° C. a copolymer as set forth in claim 9 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

12. A flexible substrate containing a coating comprising a cross-linked copolymer which is the reaction product obtained by heating at a temperature of 100° to 180° C. a copolymer as set forth in claim 9 and a curing agent therefor selected from the class consisting of polyvalent metal oxides, polyvalent metal hydroxides, salts of polyvalent metal hydroxides with weak acids, polyfunctional isocyanates, polyfunctional amines, polyfunctional oxirane compounds and polyfunctional alcohols.

PAUL S. PINKNEY.
BURT C. PRATT.
WINSTON J. WAYNE.

REFERENCES CITED

The following references are of record in the file of this patent:

UNITED STATES PATENTS

| Number | Name | Date |
|---|---|---|
| 2,467,234 | Sargent et al. | Apr. 12, 1949 |